(12) United States Patent
Kitano et al.

(10) Patent No.: US 8,110,629 B2
(45) Date of Patent: Feb. 7, 2012

(54) FLAME-RETARDANT COMPOSITION

(75) Inventors: Hajime Kitano, Ibaraki (JP); Koichi Wada, Ibaraki (JP); Hideo Takamatsu, Tokyo (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 419 days.

(21) Appl. No.: 12/088,948

(22) PCT Filed: Sep. 12, 2006

(86) PCT No.: PCT/JP2006/318010
§ 371 (c)(1),
(2), (4) Date: Apr. 2, 2008

(87) PCT Pub. No.: WO2007/040019
PCT Pub. Date: Apr. 12, 2007

(65) Prior Publication Data
US 2009/0292061 A1 Nov. 26, 2009

(30) Foreign Application Priority Data

Oct. 5, 2005 (JP) ................................. 2005-291974

(51) Int. Cl.
*C08L 53/00* (2006.01)
*C08L 53/02* (2006.01)
*C08L 51/04* (2006.01)

(52) U.S. Cl. ........ 524/505; 524/101; 524/500; 524/502; 525/84; 525/242; 252/601; 252/609

(58) Field of Classification Search ............ 524/101, 524/505; 525/84, 242; 252/601, 609
See application file for complete search history.

(56) References Cited

U.S. PATENT DOCUMENTS

| | | | |
|---|---|---|---|
| 6,414,059 B1 * | 7/2002 | Kobayashi et al. | 524/101 |
| 2004/0147657 A1 | 7/2004 | Hase et al. | |
| 2005/0119414 A1 * | 6/2005 | Sasagawa et al. | 525/242 |

FOREIGN PATENT DOCUMENTS

| | | |
|---|---|---|
| EP | 0 273 516 A2 | 7/1988 |
| JP | 2 53846 | 2/1990 |
| JP | 2 145633 | 6/1990 |
| JP | 4 255732 | 9/1992 |
| JP | 7 41636 | 2/1995 |
| JP | 10 95876 | 4/1998 |
| JP | 11 302496 | 11/1999 |
| JP | 2000 143935 | 5/2000 |
| JP | 2002 179878 | 6/2002 |
| JP | 2003 128849 | 5/2003 |

* cited by examiner

*Primary Examiner* — James J Seidleck
*Assistant Examiner* — Deve E Valdez
(74) *Attorney, Agent, or Firm* — Oblon, Spivak, McClelland, Maier & Neustadt, L.L.P.

(57) ABSTRACT

A flame-retardant composition includes: a powdery acid-modified hydrogenated block copolymer (a) having a bulk density of 0.1 to 0.4 g/ml and which is a hydrogenated block copolymer modified by addition of an unsaturated carboxylic acid or a derivative thereof, the hydrogenated block copolymer comprises a polymer block A composed mainly of a vinyl aromatic compound unit and a polymer block B composed mainly of a conjugated diene unit, and has a weight average molecular weight of 50,000 to 500,000; a polyolefin resin (b); a non-aromatic rubber softener (c); and a metal hydrate (d). The flame-retardant composition contains the components (a), (b), (c) and (d) in proportions that satisfy the following relationships (1) to (3):

$$0.1 \leq Wa/(Wa+Wb) \leq 0.9 \quad (1)$$

$$0.05 \leq Wc/(Wa+Wb+Wc) \leq 0.5 \quad (2)$$

$$0.4 \leq Wd/(Wa+Wb+Wc+Wd) \leq 0.75 \quad (3)$$

wherein Wa, Wb, Wc and Wd represent masses of the acid-modified hydrogenated block copolymer (a), the polyolefin resin (b), the non-aromatic rubber softener (c) and the metal hydrate (d), respectively.

23 Claims, No Drawings

FLAME-RETARDANT COMPOSITION

TECHNICAL FIELD

The present invention relates to a halogen-free flame-retardant composition that includes a metal hydrate, such as magnesium hydroxide and aluminum hydroxide, dispersed in a thermoplastic composition, has flexibility, and does not produce corrosive toxic gases when burnt.

BACKGROUND ART

In recent years, flame-retardant products are used in a wide range of applications, including automobile parts, home electric appliances, construction materials and parts of vehicles. In particular, molded products such as appliance wiring, cables, electric cords, plugs and sheets are required to have flexibility and high flame retardancy to ensure operability and utility.

Conventional flame-retardant compositions containing vinyl chloride resins that meet these requirements are still in use in the above-described applications. However, conventional flame-retardant composition containing vinyl chloride resins produce toxic gases that can corrode skin and mucous membranes when burnt or exposed to flame or high temperatures. If inhaled, these gases may cause suffocation, loss of consciousness or even death depending on their concentration. In addition, vinyl chloride resins contain plasticizers, such as DEHP, that disrupt endocrine function. For these reasons, there is a great need for a substitute material for these resins.

To meet this need, halogen-free flame-retardant compositions have been proposed, each of which includes a metal hydrate dispersed in a thermoplastic resin and does not produce corrosive toxic gases when burnt. In particular, flame-retardant compositions including a metal hydrate mixed in a polyethylene or polyethylene copolymer are used in commercial products known as "eco-wires" in the market of electric wire products. However, it has been pointed out that these compositions, because of containing the metal hydrates in large amounts, have problems in flexibility, processability and productivity of the products.

Many products have been proposed to eliminate these problems. Examples thereof include products using a polyolefin resin that is crystallized in a controlled manner (Patent Document 1); products including a polyolefin resin and an elastomer, such as styrene thermoplastic elastomer (Patent Documents 2 and 3); products including a polyolefin resin and a styrene thermoplastic elastomer modified with functional groups (Patent Document 4); and dynamic crosslinked products including a polyolefin resin, a styrene thermoplastic elastomer and a non-aromatic rubber softener (Patent Documents 5 and 6). Aside from resins, many flame-retardants and flame-retardant assistants have also been proposed. Nonetheless, each of these flame-retardant compositions has its own drawbacks. Some fail to provide sufficient improvements, some tend to lose strength and heat resistance, some tend to be decomposed due to required high kneading temperatures, and some require complicated production processes. Thus, no flame-retardant compositions of satisfactory properties have been not available.

Patent Document 1: Japanese Patent Application Laid-Open No. H10-95876
Patent Document 2: Japanese Patent Application Laid-Open No. H2-145633
Patent Document 3: Japanese Patent Application Laid-Open No. 2002-179878
Patent Document 4: Japanese Patent Application Laid-Open No. Hei 2-53846
Patent Document 5: Japanese Patent Application Laid-Open No. 2000-143935
Patent Document 6: Japanese Patent Application Laid-Open No. 2003-128849

DISCLOSURE OF THE INVENTION

Problems to be Solved by the Invention

Accordingly, it is an object of the present invention to provide a halogen-free flame-retardant composition that has high flame retardancy, flexibility, processability, productivity, heat resistance and strength, and does not produce corrosive toxic gases when burnt.

Means for Solving the Problems

The present invention has achieved the foregoing object by providing a flame-retardant composition that includes: a powdery acid-modified hydrogenated block copolymer (a) having a bulk density of 0.1 to 0.4 g/ml and which is a hydrogenated block copolymer modified by addition of an unsaturated carboxylic acid or a derivative thereof, wherein the hydrogenated block copolymer comprises a polymer block A composed mainly of a vinyl aromatic compound unit and a polymer block B composed mainly of a conjugated diene unit, and has a weight average molecular weight of 50,000 to 500,000; a polyolefin resin (b); a non-aromatic rubber softener (c); and a metal hydrate (d), wherein the flame-retardant composition contains these components (a), (b), (c) and (d) in proportions that satisfy the following relationships (1) to (3):

$$0.1 \leq Wa/(Wa+Wb) \leq 0.9 \tag{1}$$

$$0.05 \leq Wc/(Wa+Wb+Wc) \leq 0.5 \tag{2}$$

$$0.4 \leq Wd/(Wa+Wb+Wc+Wd) \leq 0.75 \tag{3}$$

wherein Wa, Wb, Wc and Wd represent the masses of the acid-modified hydrogenated block copolymer (a), the polyolefin resin (b), the non-aromatic rubber softener (c) and the metal hydrate (d), respectively.

Advantages of the Invention

According to the present invention, there is provided a halogen-free flame-retardant composition that has high flame retardancy, flexibility, processability, productivity, heat resistance and strength and does not produce corrosive toxic gases when burnt. The composition of the present invention can achieve high heat resistance without any crosslinking processes and can therefore be made by a simple and energy-saving manufacturing process. Also, the composition is recyclable.

BEST MODE FOR CARRYING OUT THE INVENTION

The acid-modified hydrogenated block copolymer (a) to constitute the flame-retardant composition of the present invention is a powdery material that has a bulk density of 0.1 to 0.4 g/ml and which is a hydrogenated block copolymer modified by addition an unsaturated carboxylic acid or a derivative thereof. The hydrogenated block copolymer comprises a polymer block A composed mainly of vinyl aromatic compound units and a polymer block B composed mainly of conjugated diene units, and has a weight average molecular weight of 50,000 to 500,000.

Examples of vinyl aromatic compounds from which the vinyl aromatic compound units, the main component of the polymer block A, are derived include styrene, α-methylstyrene, o-methylstyrene, m-methylstyrene, p-methylstyrene, p-t-butylstyrene, vinylnaphthalene, and vinylanthracene. Of these, styrene, α-methylstyrene and p-methylstyrene are particularly preferred. These vinyl aromatic compounds may be used either individually or in combination of two or more. As long as its intended function is not affected, the polymer block A may contain units derived from unsaturated monomers other than the vinyl aromatic compounds, such as butadiene, isoprene, 2,3-dimethyl-1,3-butadiene, 1,3-pentadiene, 1,3-hexadiene, isobutylene, methyl methacrylate, methyl vinyl ether, N-vinylcarbazole, β-pinene, 8,9-p-menthene, dipentene, methylene norbornene and 2-methylene tetrahydrofuran. The amount of these units is preferably 10% by mass or less, and more preferably 5% by mass or less, with respect to the total mass of the polymer block A.

In view of the flexibility, heat resistance and strength of the resulting flame-retardant composition, the amount of the polymer block A is preferably in the range of 10 to 40% by mass, and more preferably in the range of 15 to 35% by mass, with respect to the total mass of the hydrogenated block copolymer prior to acid modification. The amount of the polymer block A in the hydrogenated block copolymer can be determined, for example, by $^1$H-NMR spectrum.

Examples of conjugated dienes from which the conjugated diene units, the main component of the polymer block B, are derived include butadiene, isoprene, 2,3-dimethyl-1,3-butadiene, 1,3-pentadiene and 1,3-hexadiene. Of these, butadiene and isoprene are particularly preferred. These conjugated dienes may be used either individually or in combination of two or more. As long as its intended function is not affected, the polymer block B may contain units derived from monomers other than the conjugated dienes, such as styrene, o-methylstyrene, m-methylstyrene, p-methylstyrene, p-t-butylstyrene, 2,4-dimethylstyrene, vinylnaphthalene, vinylanthracene, methyl methacrylate, methyl vinyl ether, N-vinylcarbazole, β-pinene, 8,9-p-menthene, dipentene, methylene norbornene and 2-methylene tetrahydrofuran. The amount of these units is preferably 10% by mass or less, and more preferably 5% by mass or less, with respect to the total mass of the polymer block B.

Preferably 50 mol % or more, more preferably 85 mol % or more, and most preferably 95 mol % or more of the conjugated diene-based carbon-carbon double bonds contained in the hydrogenated block copolymer is hydrogenated prior to acid modification in view of the heat aging resistance and the weather resistance. Note that the hydrogenation rate can be determined by quantifying the conjugated diene-based carbon-carbon double bonds in the polymer block B before and after the hydrogenation by iodine value analysis, infrared spectrometry analysis and $^1$H-NMR analysis.

The hydrogenated block copolymer prior to acid modification preferably has a weight average molecular weight in the range of 50,000 to 500,000 and more preferably in the range of 80,000 to 400,000. If the weight average molecular weight is less than 50,000, the improvement in the heat resistance and strength of the resulting flame retardant composition becomes insufficient. If the weight average molecular weight is greater than 500,000, the processability and productivity of the flame retardant composition are reduced. The term "weight average molecular weight" as used herein refers to the molecular weight determined relative to the polystyrene standards by gel permeation chromatography (GPC).

The polymer blocks A and the polymer blocks B in the hydrogenated block copolymer prior to acid modification may be linked in any suitable manner. For example, the polymer blocks may be linked together in any of the following forms: (A-B)n, (A-B-A)n, (B-A)n, [(A-B)n-]mX, [(A-B-A)n-]mX and [(B-A)n-]mX, where A is the polymer block A, B is the polymer block B, n and m are each an integer of 1 to 5, and X is a residue of a polyfunctional coupling agent or polymerization initiator. The polymer blocks may be used either individually or in combination of two or more.

The acid-modified hydrogenated block copolymer (a) of the present invention is modified by the addition of an unsaturated carboxylic acid or a derivative thereof to the hydrogenated block copolymer. Examples of the unsaturated carboxylic acid or a derivative thereof include unsaturated carboxylic acids, such as acrylic acid, methacrylic acid, maleic acid, crotonic acid, fumaric acid, itaconic acid and citraconic acid, acid anhydrides, such as maleic anhydride, itaconic anhydride, citraconic anhydride and methyltetrahydrophthalic anhydride, and half-esters of unsaturated dicarboxylic acids and alcohols. Of these, acrylic acid, methacrylic acid and maleic anhydride are particularly preferred because of their economy and readiness to add.

The acid-modification rate of the acid-modified hydrogenated block copolymer (a) (i.e., the ratio of the mass of the units resulting from the added unsaturated carboxylic acid or a derivative thereof to the mass of the acid-modified hydrogenated block copolymer) is preferably in the range of 0.3 to 5.0%, and more preferably in the range of 1.0 to 3.0%, in view of the processability, productivity, heat-resistance and strength of the resulting flame-retardant composition. Note that the acid-modification rate can be determined as follows: a solution of the acid-modified hydrogenated block copolymer (a) is first neutralized with an excess of alkali. The excess alkali is then titrated with an acid. Subtracting the amount of the excess alkali from the amount of the total alkali used to neutralize the solution gives the amount of the alkali consumed by the acid-modified hydrogenated block copolymer (a), which can be used to determine the acid-modification rate.

It is important that the acid-modified hydrogenated block copolymer (a) in the present invention is a powdery material that has a bulk density of 0.1 to 0.4 g/ml, preferably 0.15 to 0.3 g/ml, in order to ensure absorption of the non-aromatic rubber softener and the handleability of the acid-modified hydrogenated block copolymer (a). The acid-modified hydrogenated block copolymer (a) becomes less handleable when the bulk density is less than 0.1 g/ml. The absorption of the non-aromatic rubber softener decreases when the bulk density is greater than 0.4 g/ml. The term "bulk density" as used herein is defined as a value determined by measuring the volume of the weighed powdery polymer in a graduated cylinder and dividing the mass of the polymer by the volume.

The hydrogenated block copolymer can be readily produced by a known anion polymerization technique. In one exemplary process, a vinyl aromatic compound and a conjugated diene are sequentially polymerized in an inactive organic solvent, such as n-hexane or cyclohexane, in the presence of an initiator to obtain a block copolymer. An alkyl lithium compound, such as n-butyl lithium, sec-butyl lithium or t-butyl lithium, is used as the initiator. The resulting block copolymer is then hydrogenated. Specifically, the hydrogenation of the block copolymer is carried out in a saturated hydrocarbon solvent in the presence of a hydrogenation catalyst, including Raney nickel; a heterogeneous catalyst including a metal such as Pt, Pd, Ru, Rh or Ni carried by a carrier such as carbon, alumina or diatomite; a Ziegler catalyst composed of an organometallic compound of a metal of group VIII to group X, such as cobalt or nickel, and an organoaluminum compound, such as triethylaluminum or triisobutylaluminum, or an organolithium compound; or a metallocene catalyst composed of a bis(cyclopentadienyl) compound of a transitional metal, such as titanium, zirconium or hafnium, and an organometallic compound of lithium, sodium, potassium, aluminum, zinc or magnesium. The reaction is typically carried out at a temperature of 20 to 150° C. and under a hydrogen pressure of 0.1 to 15 MPa.

The hydrogenated block copolymer can be formed into a powder in the following manner: the reaction mixture after the hydrogenation is heated to 40 to 150° C. and, if necessary, a surfactant such as a fatty acid salt and a polyoxyalkylene derivative is added. The heated mixture is poured into hot water and is steam-stripped of the solvent at a temperature equal to or higher than the boiling point of the saturated hydrocarbon solvent or, if the saturated hydrocarbon solvent forms an azeotrope with water, at a temperature equal to or higher than the azeotropic point and equal to or lower than 150° C. Water is then removed by a compression dehydrator and the residue is dried by a dryer, such as a screw extruder dryer, an expander dryer or a hot air dryer, to give the hydrogenated block copolymer in a desired powder form.

The above-described unsaturated carboxylic acid or a derivative thereof is then added to the resulting hydrogenated block copolymer to give an acid-modified block copolymer (a). While the addition can be carried out by any known technique, the following process enables the stable and effective production of the desired product of the powdery acid-modified block copolymer: predetermined amounts of the powdery hydrogenated block copolymer, the unsaturated carboxylic acid, such as acrylic acid or maleic anhydride, or a derivative thereof, and an initiator including a peroxide such as dibenzoylperoxide or an azo compound such as 2,2'-azobis(isobutylonitrile) are placed in a temperature-controlled pressure vessel equipped with a stirrer. The components are uniformly mixed at room temperature and the air in the pressure vessel is thoroughly replaced with an inert gas such as nitrogen or argon. Subsequently, the temperature is raised to 50 to 100° C. and the reaction is allowed to proceed for 2 to 5 hours to obtain the desired product of the acid-modified block copolymer (a).

Examples of the polyolefin resin (b) contained in the flame-retardant composition of the present invention include ethylene polymers, propylene polymers, poly(1-butene) and poly(4-methyl-1-pentene). These compounds may be used either individually or in combination of two or more. Of these polyolefin resins (b), ethylene polymers and propylene polymers are preferred. Ethylene polymers are still more preferred.

Examples of the ethylene polymer include high-density polyethylene, straight or branched medium-density or low-density polyethylene, ethylene-1-butene copolymer, ethylene-1-hexene copolymer, ethylene-1-heptene copolymer, ethylene-1-octene copolymer, ethylene-4-methyl-1-pentene copolymer, ethylene-vinyl acetate copolymer, ethylene-acrylic acid copolymer, ethylene-alkylacrylate copolymer, ethylene-methacrylic acid copolymer and ethylene-alkylmethacrylate copolymer. When applied a load of 21N under conditions specified in JIS K 7210, the ethylene polymer shows a melt flow rate (MFR) at 190° C. preferably in the range of 0.01 to 100 g/10 min, and more preferably in the range of 0.1 to 70 g/10 min.

Examples of the propylene polymer include a propylene homopolymer, or polymers obtained by copolymerization of a propylene, the major component, with ethylene or an α-olefin other than propylene having 10 or less carbon atoms, such as 1-butene, 1-hexene, 1-heptene, 1-octene and 4-methyl-1-pentene. Specific examples are polypropylenes and random or block polypropylene copolymers produced by using Ziegler-Natta catalysts or Kaminski catalysts. When applied a load of 21N under conditions specified in JIS K 7210, the propylene polymer shows a melt flow rate (MFR) at 230° C. preferably in the range of 0.01 to 100 g/10 min, and more preferably in the range of 0.1 to 70 g/10 min.

As the non-aromatic rubber softener (c) contained in the flame-retardant composition of the present invention, there may be used any conventionally known non-aromatic rubber softener. Examples thereof include mineral oils; plant oil-based softeners, such as peanut oil and rosin; and synthetic softeners, such as ethylene-α-olefin oligomers, polybutene and low-molecular-weight polybutadiene. In general, a mineral oil includes mixed oils having an aromatic ring, a naphthene ring and a paraffin chain. Those in which the number of the carbons in paraffin chains accounts for 50% or more of the total carbon atoms are referred to as paraffin mineral oils. Those in which the number of the carbon atoms in naphthene rings accounts for 30 to 40% of the total carbon atoms are referred to as naphthene mineral oils. Those in which the number of the carbon atoms in aromatic rings accounts for 30% or more of the total carbon atoms are referred to as aromatic mineral oils. The mineral oils used in the present invention are paraffin mineral oils and naphthene mineral oils. Of these, non-aromatic mineral oils and synthetic softeners are preferred. Of different non-aromatic mineral oils, paraffin mineral oils are particularly preferred. In this case, those containing less aromatic components are more preferred. The non-aromatic rubber softeners may be used either individually or in combination of two or more. The non-aromatic rubber softener (c) is preferably a softener having a dynamic viscosity at 40° C. in the range of 20 to 800 cSt, and more preferably in the range of 50 to 600 cSt, in view of the flame retardancy, the absorption by the acid-modified hydrogenated block copolymer (a), the processability and the productivity.

Preferred examples of the metal hydrate (d) contained in the flame-retardant composition of the present invention include compounds bearing hydroxyl groups or crystalline water, such as magnesium hydroxide, aluminum hydroxide, hydrated aluminum silicate, hydrated magnesium silicate and hydrotalcite. Magnesium hydroxide and aluminum hydroxide are particularly preferred. The metal hydrates may be used either individually or in combination of two or more. While the metal hydrate (d) may be a natural or synthetic product, synthetic products are preferred because of the uniformity of particles. Although the metal hydrate may have its surface untreated or treated with a fatty acid, such as stearic acid or oleic acid, a silane-coupling agent or silicone, it preferably has its surface either untreated or treated with a silane-coupling agent in order to ensure the heat resistance and strength of the resulting flame-retardant composition. Examples of the silane-coupling agent used for the surface treatment include vinyltriethoxysilane, vinyltrimethoxysilane, β-(3,4-epoxycyclohexyl)ethyltrimethoxysilane, γ-glysidoxypropyltrimethoxysilane, N-β-(aminoethyl)-γ-aminopropylmethyldimethoxysilane and N-phenyl-γ-aminopropyltrimethoxysilane. These metal hydrates are industrially produced commercial products and are readily available. Among such metal hydrate products are "MAGLAX NT" (brand name, available from JFE mineral), an untreated natural magnesium hydroxide product, "B1403" (brand name, available from Nippon Light Metal), an untreated synthetic aluminum hydroxide product, and "KISMA 5P" and "KISMA 5L" (brand name, available from Kyowa Chemical Industry), each a magnesium hydroxide product surface-treated with a silane-coupling agent.

The flame-retardant composition of the present invention contains the acid-modified hydrogenated block copolymer (a) and the polyolefin resin (b) in proportions that satisfy the following relationship (1):

$$0.1 \leq Wa/(Wa+Wb) \leq 0.9 \tag{1}$$

wherein Wa and Wb represent the masses of the acid-modified hydrogenated block copolymer (a) and the polyolefin resin (b), respectively.

If the value of Wa/(Wa+Wb) is less than 0.1, then the improvement in the flexibility, heat resistance and strength of the resulting flame retardant composition will become insufficient. If the value is greater than 0.9, then the processability, productivity and flame retardancy of the flame retardant composition will be decreased. The value of Wa/(Wa+Wb) is preferably in the range of 0.2 to 0.8 in view of the flexibility, processability, productivity, flame retardancy, heat resistance and strength of the resulting flame-retardant composition.

The flame-retardant composition of the present invention contains the non-aromatic rubber softener (c) in a proportion that satisfies the following relationship (2):

$$0.05 \leq Wc/(Wa+Wb+Wc) \leq 0.5 \tag{2}$$

wherein Wa, Wb and Wc represent the masses of the acid-modified hydrogenated block copolymer (a), the polyolefin resin (b) and the non-aromatic rubber softener (c), respectively.

If the value of Wc/(Wa+Wb+Wc) is less than 0.05, then the improvement in the flexibility, processability and productivity of the resulting flame retardant composition will become insufficient. If the value is greater than 0.5, then the flame retardancy, heat resistance and strength of the flame retardant composition will be decreased. The value of Wc/(Wa+Wb+Wc) is preferably in the range of 0.1 to 0.35 in view of the flexibility, processability, productivity, flame retardancy, heat resistance and strength of the resulting flame-retardant composition.

The flame-retardant composition of the present invention contains the metal hydrate (d) in a proportion that satisfies the following relationship (3):

$$0.4 \leq Wd/(Wa+Wb+Wc+Wd) \leq 0.75 \tag{3}$$

wherein Wa, Wb, Wc and Wd represent the masses of the acid-modified hydrogenated block copolymer (a), the polyolefin resin (b), the non-aromatic rubber softener (c) and the metal hydrate (d), respectively.

If the value of Wd/(Wa+Wb+Wc+Wd) is less than 0.4, then it is difficult to obtain compositions with high flame retardancy. If the value is greater than 0.75, the flexibility, processability and productivity of the flame-retardant composition will be decreased. The value of Wd/(Wa+Wb+Wc+Wd) is preferably in the range of 0.5 to 0.72 in view of the processability and flame retardancy of the resulting flame-retardant composition.

The flame-retardant composition of the present invention may further contain a flame-retardant assistant (e) to improve the flame retardancy. Examples of the flame-retardant assistant (e) include metal oxides, such as zinc oxide, aluminum oxide, magnesium oxide, titanium oxide, iron oxide and silicon oxide; boron compounds, such as zinc borate, aluminum borate and sodium borate; silicon compounds, such as silicone oils and silicone powders; exfoliated graphite; and phosphor compounds, such as triphenylphosphine and ammonium polyphosphate. These flame-retardant assistants may be used either individually or in combination of two or more. The flame-retardant assistant (e) is preferably added in an amount that satisfies the following relationship (4):

$$0.005 \leq We/(Wa+Wb+Wc+We) \leq 0.2 \tag{4}$$

wherein Wa, Wb, Wc and We represent the masses of the acid-modified hydrogenated block copolymer (a), the polyolefin resin (b), the non-aromatic rubber softener (c) and the flame-retardant assistant (e), respectively.

When necessary, the flame-retardant composition of the present invention may further contain other components, including metal-inactivating agents, lubricants, photostabilizers, pigments, heat stabilizers, anti-fogging agents, antistatic agents, dispersers, antimicrobial agents, anti-blocking agents, UV absorbents, heat-resistance stabilizers, antioxidants, colorants, crosslinking agents and crosslinking assistants. Polymers other than the above-described essential components may also be added, provided that they do not impair the advantages of the present invention.

Examples of the polymers other than the essential components include polyphenylene ether resins; polyamide resins, such as polyamide 6, polyamide 6•6, polyamide 6•10, polyamide 11, polyamide 12, polyamide 6•12, polyhexamethylenediamine terephthalamide, polyhexamethylenediamine isophthalamide and xylylene group-containing polyamides; polyester resins, such as polyethylene terephthalate and polybutylene terephthalate; acrylic resins, such as polymethylacrylate and polymethylmethacrylate; polyoxymethylene resins, such as polyoxymethylene homopolymers and polyoxymethylene copolymers; styrene resins, such as styrene homopolymers and acrylonitrile-styrene resins and acrylonitrile-butadiene-styrene resins; polycarbonate resins; ethylene elastomers, such as ethylene-propylene copolymer rubber (EPM), ethylene-propylene-nonconjugated diene copolymer rubber (EPDM); styrene elastomers, such as styrene-butadiene copolymer rubber and styrene-isoprene copolymer rubber, and hydrogenated or modified products thereof; natural rubber; synthetic isoprene rubber and liquid polyisoprene rubber and hydrogenated or modified products thereof; acrylic rubber; butyl rubber; acrylonitrile-butadiene rubber; silicone rubber; fluororubber; urethane rubber; polyurethane elastomers; polyamide elastomers; and polyester elastomers.

The flame-retardant composition of the present invention can be produced, for example, by the following process: the non-aromatic rubber softener (c) and the powdery acid-modified hydrogenated block copolymer (a) are mixed in a mixer, such as a Henschel mixer and a tumbler, until the powdery block copolymer (a) uniformly absorbs the rubber softer (c). The resulting oil-absorbed powder, the polyolefin resin (b), the metal hydrate (d) and optional other components are kneaded together at 80 to 280° C. in a melt kneader, such as a single screw extruder, a twin screw extruder, a banbury mixer, a heat roll and various kneaders.

The flame-retardant composition of the present invention can be readily formed by any of the conventionally known forming processes. For example, pellets of the flame-retardant composition obtained by the above-described process are loaded into a molder for forming by extrusion, injection molding, compression molding, pressing or calendering. The pellets are formed at a temperature of 80 to 280° C. into strands, sheets, films, tubes or molded parts. If necessary, these products may be crosslinked by using electron beams or crosslinking agents. Also, the products may be laminated with synthetic resins, elastomers, metals, wood, clothes, nonwoven fabrics, stones or other materials by using heat fusion, solvent bonding, ultrasonic bonding, dielectric bonding, laser bonding or other bonding techniques.

EXAMPLES

The present invention will now be described in detail with reference to Examples, which are not intended to limit the scope of the invention in any way.

Reference Example 1

Preparation of Powdery Acid-Modified Hydrogenated Block Copolymer (1) 700 kg of cyclohexane and 1290 g of a 10 mass % solution of sec-butyllithium in toluene (containing 129 g sec-butyllithium) were placed in a nitrogen-replaced pressure vessel equipped with a stirrer. After the components were mixed and heated to 50° C., 15 kg of styrene were added and the mixture was polymerized for 1 hour. Subsequently, a mixture of 28 kg of butadiene and 42 kg of isoprene was added to the polymerization mixture and the components were polymerized for 1 hour. This was followed by addition of additional 15 kg of styrene and polymerization for another 1 hour, resulting in a cyclohexane solution of a triblock copolymer of polystyrene-poly(butadiene/isoprene)-polystyrene in which 92% of the conjugated diene units were in 1,4-linkage. Subsequently, 3500 g of a toluene solution of a Ziegler catalyst containing 10% by mass of a nickel octoate/triethylaluminum mixture (containing 350 g nickel octoate/triethylaluminum) was added to the cyclohexane solution of the triblock copolymer under stirring. The atmosphere in the vessel was replaced with hydrogen. The mixture was then heated to 80° C. and hydrogenation was carried out under a hydrogen pressure of 3 MPa for 5 hours. This gave a cyclohexane solution of a hydrogenated block copolymer (Weight average molecular weight=101,000; styrene content=30%; hydrogenation rate=98.5%). The concentration of the hydrogenated block copolymer was 12.7%.

(2) The atmosphere in the reaction vessel containing the cyclohexane solution of the hydrogenated block copolymer obtained in (1) above was replaced with nitrogen. After removal of the catalyst, the solution was again heated to 80° C. and added to 110° C. hot water at a rate of 100 kg/hour. Meanwhile, 1 MPa steam was delivered at a rate of 50 kg/hour to perform steam stripping while the temperature in the reaction vessel was kept at 110±2° C. The resulting slurry was dehydrated to 45% by a compression dehydrator. Drying the residue by heating with a plate dryer at 120° C. gave a powdery hydrogenated block copolymer having a water content of 0.1% by mass.

(3) 100 parts by mass of the hydrogenated block copolymer and 2.0 parts by mass of maleic anhydride were placed in a nitrogen-replaced pressure vessel equipped with a stirrer. To this vessel, 0.5 parts by mass of dilauroyl peroxide were added and the components were mixed for 30 min. While continuously stirred, the mixture was then heated to 80° C. stepwise to carry out a radical addition reaction for a total of 2 hours. Subsequently, unreacted maleic anhydride was removed. Cooling the reaction mixture to room temperature gave a powdery acid-modified hydrogenated block copolymer (which may be referred to as "acid-modified hydrogenated block copolymer (a)-1", hereinafter). The bulk density and acid-modification rate of the resulting acid-modified hydrogenated block copolymer (a)-1 are shown in Table 1 below.

Reference Example 2

Preparation of Powdery Acid-Modified Hydrogenated Block Copolymer (1) 700 kg of cyclohexane and 3225 g of a 10 mass % solution of sec-butyllithium in toluene (containing 322.5 g sec-butyllithium) were placed in a nitrogen-replaced pressure vessel equipped with a stirrer. After the components were mixed and heated to 50° C., 15 kg of styrene were added and the mixture was polymerized for 1 hour. Subsequently, a mixture of 28 kg of butadiene and 42 kg of isoprene was added to the polymerization mixture and the components were polymerized for 1 hour. This was followed by addition of additional 15 kg of styrene and polymerization for another 1 hour, resulting in a cyclohexane solution of a triblock copolymer of polystyrene-poly(butadiene/isoprene)-polystyrene in which 92% of the conjugated diene units were in 1,4-linkage. Subsequently, 3500 g of a toluene solution of a Ziegler catalyst containing 10% by mass of a nickel octoate/triethylaluminum mixture (containing 350 g nickel octoate/triethylaluminum) was added to the cyclohexane solution of the triblock copolymer under stirring. The atmosphere in the vessel was replaced with hydrogen. The mixture was then heated to 80° C. and hydrogenation was carried out under a hydrogen pressure of 3 MPa for 5 hours. This gave a cyclohexane solution of a hydrogenated block copolymer (Weight average molecular weight=40,000; styrene content=30%; hydrogenation rate=98.8%). The concentration of the hydrogenated block copolymer was 12.8%.

(2) The atmosphere in the reaction vessel containing the cyclohexane solution of the hydrogenated block copolymer obtained in (1) above was replaced with nitrogen. After removal of the catalyst, the solution was again heated to 80° C. and added to 110° C. hot water at a rate of 100 kg/hour. Meanwhile, 1 MPa steam was delivered at a rate of 50 kg/hour to perform steam stripping while the temperature in the reaction vessel was kept at 110±2° C. The resulting slurry was dehydrated to 45% by a compression dehydrator. Drying the residue by heating with a plate dryer at 80° C. gave a powdery hydrogenated block copolymer having a water content of 0.1% by mass.

(3) Using the hydrogenated block copolymer obtained in (2) above, the same procedure was followed as in (3) of Reference Example 1 to give a powdery acid-modified hydrogenated block copolymer (which may be referred to as "acid-modified hydrogenated block copolymer (1)," hereinafter). The bulk density and acid-modification rate of the resulting acid-modified hydrogenated block copolymer (1) are shown in Table 1 below.

Reference Example 3

Preparation of Pellet-Like Acid-Modified Hydrogenated Block Copolymer (1) 700 kg of cyclohexane and 1613 g of a 10 mass % solution of sec-butyllithium in toluene (containing 161.3 g sec-butyllithium) were placed in a nitrogen-replaced pressure vessel equipped with a stirrer. After the components were mixed and heated to 50° C., 15 kg of styrene were added and the mixture was polymerized for 1 hour. Subsequently, a mixture of 28 kg of butadiene and 42 kg of isoprene was added to the polymerization mixture and the components were polymerized for 1 hour. This was followed by addition of additional 15 kg of styrene and polymerization for another 1 hour, resulting in a cyclohexane solution of a triblock copolymer of polystyrene-poly(butadiene/isoprene)-polystyrene in which 92% of the conjugated diene units were in 1,4-linkage. Subsequently, 3500 g of a toluene solution of a Ziegler catalyst containing 10% by mass of a nickel octoate/triethylaluminum mixture (containing 350 g nickel octoate/triethylaluminum) was added to the cyclohexane solution of the triblock copolymer under stirring. The atmosphere in the vessel was replaced with hydrogen. The mixture was then heated to 80° C. and hydrogenation was carried out under a hydrogen pressure of 3 MPa for 5 hours. This gave a cyclohexane solution of a hydrogenated block copolymer (Weight average molecular weight=80,000; styrene content=30%; hydrogenation rate=97.0%). The concentration of the hydrogenated block copolymer was 12.8%.

(2) The atmosphere in the reaction vessel containing the cyclohexane solution of the hydrogenated block copolymer obtained in (1) above was replaced with nitrogen. After removal of the catalyst, the solution was again heated to 80° C. and added to 110° C. hot water at a rate of 100 kg/hour. Meanwhile, 1 MPa steam was delivered at a rate of 50 kg/hour to perform steam stripping while the temperature in the reaction vessel was kept at 110±2° C. The resulting slurry was dehydrated to 45% by a compression dehydrator. Drying the residue by heating with a plate dryer at 120° C. gave a powdery hydrogenated block copolymer having a water content of 0.1% by mass.

(3) 2.0 parts by mass of maleic anhydride and 1.0 parts by mass of silica-carried 1,3-di(t-butylperoxyisopropyl)benzene (Content: 40% by mass) were mixed with the powdery hydrogenated block copolymer obtained in (2) above. The mixture was fed to the hopper of a twin screw extruder (L/D ratio=35) heated to 230° C. The reaction was carried out by extruding the mixture under the screw revolution condition of 200 rpm. The volatile components containing unreacted maleic anhydride were removed by vacuum from the vent located adjacent to the die. The strand extruded from the die was cooled and cut in a pelletizer into pellets of the acid-modified hydrogenated block copolymer (which may be referred to as "acid-modified hydrogenated block copolymer (2)," hereinafter). The bulk density and acid-modification rate of the resulting acid-modified hydrogenated block copolymer (2) are shown in Table 1 below.

TABLE 1

| | Reference Example 1 | Reference Example 2 | Reference Example 3 |
|---|---|---|---|
| Hydrogenated block copolymer prior to acid modification: Weight average molecular weight | 101,000 | 40,000 | 80,000 |
| Acid-modified hydrogenated block copolymer | (a)-1 | (1) | (2) |
| Form | Powder | Powder | Pellet |
| Bulk density (g/ml) | 0.20 | 0.22 | 0.53 |
| Acid-modification rate (%) | 1.40 | 1.41 | 1.70 |

The following components were used in Examples and Comparative Examples described below:

Polyolefin Resin (b)

(b)-1: EVAFLEX-360 (Brand name, available from Du Pont-Mitsui Polychemicals; ethylene-vinyl acetate copolymer resin; Melt flow rate (MFR)=2 g/10 min)

(b)-2: EVAFLEX-40W (Brand name, available from Du Pont-Mitsui Polychemicals; ethylene-vinyl acetate copolymer resin; Melt flow rate (MFR)=65 g/10 min)

Non-Aromatic Rubber Softener (c)

(c)-1: DIANAPROCESS PW-380 (Brand name, available from Idemitsu Kosan; paraffin process oil; dynamic viscosity=381.6 cSt (40° C.))

Metal Hydrate (d)

(d)-1: KISMA 5P (Brand name, available from Kyowa Chemical Industry; magnesium hydroxide surface-treated with a silane-coupling agent)

(d)-2: MAGLAX NT (Brand name, available from JFE mineral; natural magnesium hydroxide (with no surface treatment)

Flame-Retardant Assistant (e)

(e)-1: Type II zinc oxide (Brand name, available from Sakai Chemical Industry)

(e)-2: DC4-7081 (Brand name, available from Dow Cowing Toray Silicone; silicone powder)

Antioxidant

IRGANOX 1010 (Brand name, available from Ciba Specialty Chemicals; hindered phenol antioxidant)

Examples 1 through 4 and Comparative Examples 1 and 2

(1) The powdery acid-modified hydrogenated block copolymer shown in Table 2 was placed in a Henschel mixer. While the mixer was operated at 400 rpm, the non-aromatic rubber softener (c) was gradually added and the mixture was stirred for 4 min until the powder absorbs the non-aromatic rubber softer. Subsequently, the flame-retardant assistant (e) (except for Example 3), the antioxidant, the polyolefin resin (b) and the metal hydrate (d) (20% by mass of the required amount) shown in Table 2 were added in succession to form a preblend product. The preblend product was left for 1 hour to facilitate oil absorption. The product was then fed to the hopper of a twin screw extruder (L/D ratio=54) heated to 230° C. and was extruded and kneaded under the screw revolution condition of 100 rpm. During the extrusion, the remainder (80% by mass) of the metal hydrate (d) was added to the extruder from the two side feeders to form a uniform flame-retardant composition. The volatile components were removed by vacuum from the last of the three vents. The strand extruded from the die was cooled and cut in a pelletizer into pellets of the flame-retardant composition.

(2) The flame-retardant composition obtained in (1) above was passed through a roll mill heated to 110° C. to form a sheet. The sheet was then pressed for 3 min at 10 MPa on a press heated to 190° C. using a spacer with a desired thickness. Subsequently, the sheet was cooled on a water-cooled press for 2 min to make a pressed sheet.

Comparative Example 3

(1) The pellet-like acid-modified hydrogenated block copolymer and the polyolefin resin (b) shown in Table 2 were mixed in a tumbler for 5 min to obtain a pellet-like mixture. Meanwhile, the metal hydrate (d), the flame-retardant assistant (e) and the antioxidant shown in Table 2 were placed in a Henschel mixer and the components were mixed at 400 rpm for 10 min to form a powdery mixture. Subsequently, the pellet-like mixture was fed to the hopper of a twin screw extruder (L/D ratio=54) heated to 230° C. and was extruded and kneaded under screw revolution condition of 100 rpm. During the extrusion, the powdery mixture was fed to the two side feeders and the non-aromatic rubber softener (c) shown in Table 2 was fed to the two vents using a metered feeder. The volatile components were removed by vacuum from the last of the three vents. The strand extruded from the die was-cooled and cut in a pelletizer into pellets of the flame-retardant composition.

(2) The flame-retardant composition obtained in (1) above was processed in the same manner as in each of Examples 1 through 4 and Comparative Examples 1 and 2 to make a pressed sheet.

The flexibility, strength, heat resistance, flame retardancy and processability of each flame-retardant composition were evaluated as described below. The results were shown in Table 2 along with the proportions of the components of each flame-retardant composition.

Hardness

According to JIS K-6253, the hardness of each pressed sheet of flame-retardant composition was measured. The hardness was measured by a type A durometer: the measurement at 5 sec was recorded and the A hardness value was used as an index of the flexibility of the sheet.

of flame-retardant composition. Using a Tirrill burner, a vertically suspended test piece was burned at the bottom for 10 sec. The length of time that the sample kept burning was measured. A sample that burned for a period of 10 sec or less was rated as "A"; a sample that burned for a period of more than 10 sec and 30 sec or less was rated as "B"; and a sample that burned for a period of more than 30 sec was rated as "C".

MFR

According to JIS K7210, the weight of each fire-retardant composition discharged from a capillary tube per unit time was measured and was used as an index of the processability of the composition. The measurements were taken at a temperature of 230° C. and at a load of 5 kg. A higher MFR indicates a higher fluidity and, thus, a higher processability.

TABLE 2

|  | Example 1 | Example 2 | Example 3 | Example 4 | Comparative Example 1 | Comparative Example 2 | Comparative Example 3 |
|---|---|---|---|---|---|---|---|
| [Parts by mass] | | | | | | | |
| Acid-modified hydrogenated block copolymer (a)-1 | 100 | 100 | 100 | 100 | — | — | — |
| Hydrogenated block copolymer (a)-1 prior to acid modification | — | — | — | — | 100 | — | — |
| Acid-modified hydrogenated block copolymer (1) | — | — | — | — | — | 100 | — |
| Acid-modified hydrogenated block copolymer (2) | — | — | — | — | — | — | 100 |
| Polyolefin resin (b)-1 | 105 | 47 | 105 | 105 | 105 | 105 | 105 |
| Polyolefin resin (b)-2 | 45 | 20 | 45 | 45 | 45 | 45 | 45 |
| Non-aromatic rubber softener (c)-1 | 44 | 71 | 44 | 44 | 44 | 44 | 44 |
| Metal hydrate (d)-1 | 529 | 448 | 547 | — | 529 | 529 | 529 |
| Metal hydrate (d)-2 | — | — | — | 529 | — | — | — |
| Flame-retardant assistant (e)-1 | 9 | 7 | — | 9 | 9 | 9 | 9 |
| Flame-retardant assistant (e)-2 | 9 | 7 | — | 9 | 9 | 9 | 9 |
| Antioxidant | 3.0 | 2.4 | 3.0 | 3.0 | 3.0 | 3.0 | 3.0 |
| Flexibility | | | | | | | |
| Hardness (Type A, after 5 sec) | 88A | 83A | 90A | 87A | 87A | 89A | 91A |
| Strength | | | | | | | |
| Break strength (MPa) | 12.5 | 10.3 | 12.7 | 10.9 | 4.4 | 6.2 | 8.1 |
| Elongation to break (%) | 150 | 120 | 150 | 100 | 420 | 80 | 90 |
| Heat resistance | | | | | | | |
| Thermal deformation (%) | 9 | 12 | 8 | 11 | 50 | 42 | 24 |
| Flame-retardancy | | | | | | | |
| Vertical flame-retardancy test on 1.5 mm-thick test piece | A | A | A | A | C | A | B |
| Processability | | | | | | | |
| MFR (g/10 min) | 0.5 | 0.2 | 0.1 | 0.8 | 3.9 | 0.5 | 0.6 |

Strength

Using a No. 5 dumbbell-shaped cutter, test pieces were stamped out of each pressed sheet of flame-retardant composition. According to JIS K-6251, each test piece was then analyzed for the break strength and elongation to break. Each test piece was stretched at a rate of 50 cm/min.

Thermal Deformation

Test pieces, each sized 2 mm (Thickness)×15 mm (Width)×30 mm (Length), were cut out of each press sheet of flame-retardant composition. A thermal deformation test was conducted according to JIS C-3005 (Temperature=136° C.; load=500 g). The thermal deformation of each test piece is given by the percentage (%) of the thickness of the test piece after heating relative to the thickness of the test piece before heating. A smaller thermal deformation indicates a higher heat resistance Flame-Retardancy Test pieces, each sized 1.5 mm (Thickness)×13 mm (Width)×130 mm (Length), were cut out of each press sheet As can be seen from Table 2, each of the flame-retardant compositions of Examples 1 through 4 has proven to meet all of the requirements of the present invention: each composition has high flexibility, processability, heat resistance and strength while being highly flame retardant.

In contrast, the composition of Comparative Example 1, which uses a hydrogenated, but not acid-modified block copolymer in place of the acid-modified hydrogenated block copolymer (a), exhibits a significant decrease in the heat resistance, strength and flame retardancy.

The composition of Comparative Example 2, in which the acid-modified block copolymer does not meet the requirement of the present invention regarding molecular weight, shows less significant improvement in heat resistance and strength.

The composition of Comparative Example 3, in which the bulk density of the acid-modified hydrogenated block copolymer exceeds the range specified by the present invention, shows a significant decrease in the flexibility, strength, heat resistance and flame retardancy. Furthermore, the production of the composition of Comparative Example 3 requires complicated processes as described above.

INDUSTRIAL APPLICABILITY

Not only is the flame-retardant composition of the present invention highly flexible, but it also has high formability, heat resistance and strength while showing high flame retardancy. The material is safe for human body and has little effects on environment since it does not produce halogen-based toxic or corrosive gases when exposed to flame or high temperatures. For these reasons, the flame-retardant composition of the present invention is suitable for use in various applications, including industrial applications, such as lead wires of electric switchboards and motors, heat-shrinkable tubes and tapes for bundling wires; office appliances, such as televisions, projectors, personal computers, printers, scanners, keyboards, fax machines and photocopiers; home electric appliances, such as washing machines, dryers, refrigerators, vacuum cleaners, toasters, coolers, air conditioners, televisions, videocassette recorders, DVD players, digital cameras, cellular phones, CD players, radios, speakers, alarms and security cameras; electronic appliances, such as microwaves, rice cookers and electronic heaters; auxiliary parts of electric or electronic appliances, such as control cables for game machines, LAN cables, multicore cables, earphones and battery chargers; parts for automobiles, boats and aircrafts, such as insulative wire harnesses, car navigation systems, chairs and sofas, ceiling materials and carpets; parts for vehicles, such as straps, blinds and car-connecting hoods; construction materials, such as wall papers, floorings, interior materials, exterior materials, door materials, porch blinds and tarps; and leisure applications, such as tents, portable power generators and lights.

The invention claimed is:
1. A flame-retardant composition comprising:
an acid-modified hydrogenated block copolymer (a);
a polyolefin resin (b);
a non-aromatic rubber softener (c); and
a metal hydrate (d);
wherein the acid-modified hydrogenated block copolymer (a) is prepared by addition of an unsaturated carboxylic acid or a derivative thereof to a non-acid-modified hydrogenated block copolymer,
the non-acid-modified hydrogenated block copolymer comprises:
at least one polymer block (A), which comprises a vinyl aromatic compound unit; and
at least one polymer block (B), which comprises a conjugated diene unit;
a content of the vinyl aromatic compound is in a range of 10 to 40% by mass with respect to the total mass of the hydrogenated block copolymer prior to acid modification,
a bulk density of the acid-modified hydrogenated block copolymer (a) is 0.1 to 0.4 g/ml,
a weight average molecular weight of the non-acid-modified hydrogenated block copolymer is from 50,000 to 500,000, and

$$0.1 \leq Wa/(Wa+Wb) \leq 0.9 \quad (1)$$

$$0.05 \leq Wc/(Wa+Wb+Wc) \leq 0.5 \quad (2)$$

$$0.4 \leq Wd/(Wa+Wb+Wc+Wd) \leq 0.75 \quad (3)$$

wherein Wa, Wb, Wc and Wd are masses of the acid-modified hydrogenated block copolymer (a), the polyolefin resin (b), the non-aromatic rubber softener (c) and the metal hydrate (d), respectively.

2. The flame retardant composition according to claim 1, wherein the vinyl aromatic compound unit of the block (A) is derived from at least one selected from the group consisting of styrene, α-methylstyrene, o-methylstyrene, m-methylstyrene, p-methylstyrene, p-t-butylstyrene, vinylnaphthalene, and vinylanthracene.

3. The flame retardant composition according to claim 1, wherein the at least one conjugated diene unit of the block (B) is derived from at least one selected from the group consisting of butadiene, isoprene, 2,3-dimethyl-1,3-butadiene, 1,3-pentadiene and 1,3-hexadiene.

4. The flame retardant composition according to claim 1, wherein at least 50 mol % of conjugated diene-based carbon-carbon double bonds contained in the (B) block copolymer are hydrogenated prior to acid modification.

5. The flame retardant composition according to claim 1, wherein the added unsaturated carboxylic acid is at least one selected from the group consisting of acrylic acid, methacrylic acid, maleic acid, crotonic acid, fumaric acid, itaconic acid and citraconic acid.

6. The flame retardant composition according to claim 1, wherein the added derivative of an unsaturated carboxylic acid is an acid anhydride or a half-ester of an unsaturated dicarboxylic acid and an alcohol.

7. The flame retardant composition according to claim 6, wherein the acid anhydride is at least one selected from the group consisting of maleic anhydride, itaconic anhydride, citraconic anhydride and methyltetrahydrophthalic anhydride.

8. The flame retardant composition according to claim 1, wherein a ratio of the mass of the units resulting from the added unsaturated carboxylic acid or a derivative of an unsaturated carboxylic acid to a mass of the acid-modified hydrogenated block copolymer is from 0.3 to 5.0%.

9. The flame retardant composition according to claim 1, wherein the polyolefin resin (b) is at least one selected from the group consisting of an ethylene polymer, a propylene polymer, poly(1-butene) and poly(4-methyl-1-pentene).

10. The flame retardant composition according to claim 9, wherein the polyolefin resin (b) is an ethylene polymer selected from the group consisting of high-density polyethylene, straight or branched medium-density or low-density polyethylene, ethylene-1-butene copolymer, ethylene-1-hexene copolymer, ethylene-1-heptene copolymer, ethylene-1-octene copolymer, ethylene-4-methyl-1-pentene copolymer, ethylene-vinyl acetate copolymer, ethylene-acrylic acid copolymer, ethylene-alkylacrylate copolymer, ethylene-methacrylic acid copolymer and ethylene-alkylmethacrylate copolymer.

11. The flame retardant composition according to claim 1, wherein the non-aromatic rubber softener (c) is at least one selected from the group consisting of a mineral oil, a plant oil-based softener, and a synthetic softener.

12. The flame retardant composition according to claim 11, wherein the mineral oil is paraffin mineral oil or a naphthene mineral oil.

13. The flame retardant composition according to claim 11, wherein a dynamic viscosity at 40° C. of the non-aromatic rubber softener is from 20 to 800 cSt.

14. The flame retardant composition according to claim 1, wherein the metal hydrate (d) is at least one metal compound having hydroxyl groups or crystalline water.

15. The flame retardant composition according to claim 14, wherein the metal hydrate (d) is at least one selected from the group consisting of magnesium hydroxide, aluminum hydroxide, hydrated aluminum silicate, hydrated magnesium silicate and hydrotalcite.

16. The flame retardant composition according to claim 14 wherein the metal hydrate (d) is surface treated with a silane-coupling agent selected from the group consisting of vinyltriethoxysilane, vinyltrimethoxysilane, β-(3,4-epoxycyclohexyl)ethyltrimethoxysilane, γ-glysidoxypropyltrimethoxysilane, N-β-(aminoethyl)-γ-aminopropylmethyldimethoxysilane and N-phenyl-γ-aminopropyltrimethoxysilane.

17. The flame retardant composition according to claim 1, further comprising at least one flame-retardant assistant (e) selected from the group consisting of zinc oxide, aluminum oxide, magnesium oxide, titanium oxide, iron oxide, silicon oxide, zinc borate, aluminum borate, sodium borate, a silicone oil, a silicone powder, an exfoliated graphite, triphenylphosphine and ammonium polyphosphate.

18. The flame retardant composition according to claim 17, wherein $$0.005 \leq We/(Wa+Wb+Wc+We) \leq 0.2 \quad (4)$$

wherein Wa, Wb, Wc and We are the masses of the acid-modified hydrogenated block copolymer (a), the polyolefin resin (b), the non-aromatic rubber softener (c) and the flame-retardant assistant (e), respectively.

19. The flame-retardant composition according to claim 1, wherein the acid-modified hydrogenated block copolymer (a) is prepared by a process, comprising:
 (I) heating a solution of a non-acid-modified hydrogenated block copolymer at 40 to 150° C. and adding the solution into hot water,
 wherein the non-acid-modified hydrogenated block copolymer has a weight average molecular weight of from 50,000 to 500,000, and comprises a polymer block (A), which comprises a vinyl aromatic compound unit, and a polymer block (B), which comprises a conjugated diene unit;
 (II) steam stripping the hot water mixture obtained in (I) at 150° C. or less, dehydrating, and drying the resultant solution to obtain a hydrogenated block copolymer;
 (III) mixing the resultant dried hydrogenated block copolymer with an unsaturated carboxylic acid or a derivative thereof, and an initiator; and
 (IV) acid modifying the resultant mixture by reacting at 50 to 100° C.

20. A method for manufacturing the flame-retardant composition according to claim 1, comprising:
 (I) heating at 40 to 150° C. a solution of a non-acid-modified hydrogenated block copolymer that has undergone hydrogenation and adding the solution into hot water,
 wherein the non-acid-modified hydrogenated block copolymer has a weight average molecular weight of from 50,000 to 500,000, and comprises a polymer block (A), which comprises a vinyl aromatic compound unit, and a polymer block (B), which comprises a conjugated diene unit;
 (II) steam stripping the hot water mixture obtained in (I) at 150° C. or less, dehydrating, and drying the resultant solution to obtain a hydrogenated block copolymer;
 (III) mixing the resultant dried hydrogenated block copolymer with an unsaturated carboxylic acid or a derivative thereof, and an initiator;
 (IV) acid modifying the resultant mixture by reacting at 50 to 100° C. to obtain an acid-modified hydrogenated block copolymer (a); and
 (V) kneading the resultant acid-modified hydrogenated block copolymer (a), a polyolefin resin (b), a non-aromatic rubber softener (c): and a metal hydrate (d), where $$0.1 \leq Wa/(Wa+Wb) \leq 0.9 \quad (1)$$

$$0.05 \leq Wc/(Wa+Wb+Wc) \leq 0.5 \quad (2)$$

$$0.4 \leq Wd/(Wa+Wb+Wc+Wd) \leq 0.75 \quad (3)$$

wherein Wa, Wb, Wc and Wd are masses of the acid-modified hydrogenated block copolymer (a), the polyolefin resin (b), the non-aromatic rubber softener(c) and the metal hydrate (d), respectively.

21. The method according to claim 20, wherein
 in (V), the acid-modified hydrogenated block copolymer (a) absorbs the non-aromatic rubber softener(c) and is kneaded after adding the polyolefin resin (b) and the metal hydrate (d).

22. The method according to claim 20, wherein
 in (V), at least one flame-retardant assistant (e) selected from a group consisted of zinc oxide, aluminum oxide, magnesium oxide, titanium oxide, iron oxide, silicon oxide, zinc borate, aluminum borate and sodium borate, silicone oil, silicone powder, exfoliated graphite, triphenylphosphine, and ammonium polyphosphate is added prior to kneading.

23. The method according to claim 22, wherein
an amount of the flame-retardant assistant (e) satisfies the following ratio (4):

$$0.005 \leq We/(Wa+Wb+We+We) \leq 0.2 \quad (4)$$

wherein Wa, Wb, We and We are masses of the acid-modified hydrogenated block copolymer (a), the polyolefin resin (b), the non-aromatic rubber softener(c) and the flame-retardant assistant (e), respectively.

* * * * *